June 29, 1965  F. A. ADCOCK  3,191,457
PEDALS
Filed March 5, 1963
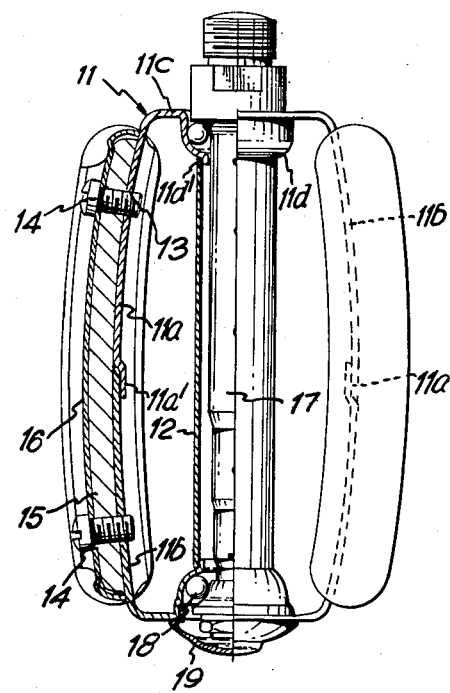
INVENTOR:
Frederick A. Adcock
BY
Bierman + Bierman

3,191,457
PEDALS

Frederick Arthur Adcock, Wollaton, Nottingham, England, assignor to Raleigh Industries Limited, Northern Ireland and the Isle of Man, a company of Great Britain
Filed Mar. 5, 1963, Ser. No. 263,052
Claims priority, application Great Britain, Apr. 14, 1962, 14,514/62
2 Claims. (Cl. 74—594.4)

The invention concerns an improved pedal assembly.

It is among the objects of the present invention to provide a simple, yet effective pedal assembly which is inexpensive in manufacture but which is of wide application.

Thus according to the present invention a pedal assembly comprises two similar U-shaped or like elements mounted in opposed end to end disposition upon a pedal barrel so as to form a pedal frame therewith, the said elements being joined together thus to maintain the said disposition.

In a preferred embodiment the said assembly also includes pedal blocks applied to the pedal frame along opposite sides thereof.

The invention will now be described further, by way of example only, with reference to the single figure of the accompanying drawing, illustrating, partly in cross-section, one embodiment thereof.

Referring now to the drawing the pedal assembly according to the invention comprises two substantially U-shaped elements 11 arranged in opposed end-to-end disposition upon a pedal barrel 12, and maintained in such disposition by the securing of a lip 11a' at the end of one limb 11a of each element to the adjacent limb 11b of the other element.

Each U-shaped element 11 has the central region of the base 11c thereof inwardly dished to form a ball cup 11d and the middle portion of the cup is pressed out to form a flange 11d' to receive one end of the barrel 12. The end of one limb 11a of the element has the lip 11a' formed as an extension thereto, the said lip 11a' being displaced relative to the plane of the limb 11a to form a step to receive the end of the limb 11b of the other element upon assembly. Screw threaded holes 13 are provided in the elements 11 to receive screws 14 therein, the said screws 14 serving to hold a pedal block 15 in position upon the frame formed by the elements 11. A decorative retaining strip 16 will normally be provided at the outer face of the block 15 and will be held in position by the said screws 14.

Thus to make up the assembly the similar elements 11 are arranged in opposed end-to-end disposition with the pedal barrel 12 therebetween and with the end of each limb 11b engaging the step formed by the lip 11a' of the other element. The elements 11 are joined together by spot welding at the step and the pedal blocks 15 and decorative strips 16 are secured to the said elements by the screws. It is to be appreciated of course, that in alternative embodiments other means of joining may be used if preferred.

A pedal spindle 17 is applied to the assembly and secured in co-axial relationship therewith in conventional manner, the appropriate ball bearings 18 being located in the ball cups 11d. An end cap 19 is applied to the pedal assembly at the outer end thereof.

We have found that such a pedal as is proposed is simple in construction and of ready manufacture. Furthermore, since the decorative strips are readily removable, such strips may be interchanged for strips of a different form or pattern during assembly thus to vary in a ready manner the external appearance of the pedal.

The invention is not restricted to the particular features of the embodiment described since alternatives will readily present themselves. For example, the elements 11 may if desired, have limbs of unequal length, one such element being turned through 180° before being applied to its mate to form the pedal frame.

Furthermore, alternative ways of joining the elements together are available and would immediately be evident to one skilled in the art.

I claim:

1. A pedal assembly comprising a spindle; a barrel concentric with said spindle; two identical U-shaped members each having a portion of one end of one arm offset inwardly; one arm of each member overlying the offset portion of the one arm of the other member, whereby a continuous outer surface is presented at the zone of overlay; the base of each U-shaped member having a dish integral therewith and forming a ball bearing cup, each ball cup having an inwardly directed circular lip; each lip being atttached to an end of said barrel; a plurality of bearing balls in each cup; and means on each end of said spindle retaining said bearing balls in each cup, and thereby retaining said U-shaped members on the spindle; a pedal block on each outer surface formed by the joined arms of the U-shaped members, and securing means passing through the pedal blocks and joined arms.

2. A pedal assembly according to claim 1 characterized in that a pair of spaced set screws passing thru said pedal block are anchored in said two members, respectively, and constitute said securing means.

References Cited by the Examiner

UNITED STATES PATENTS

| 176,835 | 5/76 | Carson. | |
|---|---|---|---|
| 1,974,247 | 9/34 | Musselman | 74—594.4 |
| 2,567,785 | 9/51 | Rieger | 29—463 X |

FOREIGN PATENTS

| 434,154 | 8/35 | Great Britain. |
|---|---|---|
| 868,113 | 5/61 | Great Britain. |
| 91,067 | 12/37 | Sweden. |

BROUGHTON G. DURHAM, *Primary Examiner.*

MILTON KAUFMAN, *Examiner.*